United States Patent
Woods et al.

(10) Patent No.: US 7,058,834 B2
(45) Date of Patent: Jun. 6, 2006

(54) SCAN-BASED STATE SAVE AND RESTORE METHOD AND SYSTEM FOR INACTIVE STATE POWER REDUCTION

(76) Inventors: Paul Richard Woods, 3781 NW. Tyler Pl., Corvallis, OR (US) 97330; Jay Dean McDougal, 3335 NW. Goldenrod Pl., Corvallis, OR (US) 97330

(*) Notice: Subject to any disclaimer, the term of this patent is extended or adjusted under 35 U.S.C. 154(b) by 589 days.

(21) Appl. No.: 09/844,624

(22) Filed: Apr. 26, 2001

(65) Prior Publication Data
US 2002/0162037 A1    Oct. 31, 2002

(51) Int. Cl.
*G06F 1/30* (2006.01)
(52) U.S. Cl. ...................................... 713/324
(58) Field of Classification Search ......... 713/300–340
See application file for complete search history.

(56) References Cited

U.S. PATENT DOCUMENTS

| | | | |
|---|---|---|---|
| 4,980,836 A * | 12/1990 | Carter et al. ................. | 713/322 |
| 5,106,216 A | 4/1992 | Kim | |
| 5,504,910 A * | 4/1996 | Wisor et al. ................. | 713/322 |
| 5,596,756 A * | 1/1997 | O'Brien ....................... | 713/340 |
| 5,628,020 A * | 5/1997 | O'Brien ....................... | 713/322 |
| 5,765,003 A * | 6/1998 | MacDonald et al. ......... | 713/322 |
| 5,790,878 A * | 8/1998 | Anderson et al. ........... | 713/340 |
| 5,870,617 A * | 2/1999 | Walsh et al. ................. | 713/324 |
| 5,925,134 A * | 7/1999 | Solomon ...................... | 713/324 |
| 6,665,802 B1 * | 12/2003 | Ober ........................... | 713/320 |

FOREIGN PATENT DOCUMENTS

| | | |
|---|---|---|
| EP | 537679 | 4/1993 |
| EP | 916508 | 5/1999 |
| GB | 2140746 | 12/1984 |

OTHER PUBLICATIONS

Intel XScale Microarchitecture Technical Summary 2000.

* cited by examiner

*Primary Examiner*—Paul R. Myers

(57) ABSTRACT

A scan-based state save and restore method and system for inactive state power reduction. An integrated circuit that has an inactive state has normal circuitry and scan circuitry. Upon receipt of a sleep signal, the state of the normal circuitry is accessed by employing scan circuitry. The state is then stored in a memory. The power is disconnected from the normal circuitry. Upon wake-up, the normal circuitry is re-connected to the power. The state of the circuit is accessed from the memory and restored to the normal circuitry by employing scan circuitry.

20 Claims, 7 Drawing Sheets

SCAN-BASED STATE SAVE AND RESTORE METHOD AND SYSTEM FOR INACTIVE STATE POWER REDUCTION

FIELD OF THE INVENTION

The present invention relates generally to power management, and more particularly, to a scan-based state save and state restore method and system for inactive state power reduction.

BACKGROUND OF THE INVENTION

Battery operated devices typically have some type of power management in order to conserve the battery power and extend the length of operation of the device before having to re-charge the batteries or otherwise replace the drained batteries with fresh batteries.

For example, battery operated devices that include complimentary metal oxide semiconductor (CMOS) circuits can reduce battery drain during periods of inactivity by stopping the system clock signal that is provided to the CMOS integrated circuits (also commonly referred to as "chips"). Stopping the clock reduces power consumption without losing the state of the chip. The state is simply the current information when the clock is stopped that is needed to resume the current processes and operation of the chips when the clock is re-started.

When activity resumes (e.g., when a user begins to provide input signals), the operation of the chips resumes by simply starting the clock. Traditionally, with CMOS manufacturing processes that feature a gate length of about one micron, the current draw due to leakage (i.e., the leakage current) when the clock is stopped is very low (e.g., about one nano amperes). This low leakage current is tolerable for many portable applications that use battery power.

With the advent of more complex circuits that require increased circuit densities, and the need for faster processing speeds, a trend in semiconductor manufacturing is to decrease the gate lengths to sub-micron levels. For example, 0.25 micron CMOS processes and 0.18 micron CMOS processes provide increased circuit densities and faster processing speeds.

Unfortunately, one trade-off for the increased speed and increased circuit density is that these processes typically have a much higher leakage current of about 10 micro amperes when the clocks are stopped than the processes with gate lengths greater than one micron.

Consider the situation where a user leaves the device inactive for a day. When the user returns to the device, the device is completely drained of battery power because of the high leakage current. The battery drain occurs even though the device was not used at all during the period of inactivity, and the device was is sleep mode during the period of inactivity. It is evident that such a situation is unacceptable to the user.

Consequently, for circuits that are manufacture with these sub-micron processes, it is no longer sufficient to simply stop the clock. Instead, the chips must be completely disconnected from the power supply in order to conserve power. When the chips are completely disconnected from the power supply, there is no leakage current, thereby saving power. However, before disconnecting the power, it is important that the state information of the chips first be saved to a storage that can store the state information even when the power is disconnected. One reason for saving the state information is to meet an expectation of users. Upon return to the device, users expect to find the same applications and data files present that were present when the user last used the device. In this regard, when the period of inactivity is ended, it is desirable for the device to use the state information to automatically restore the state of the device prior to the period of inactivity.

Otherwise, a user would have to manually restore the device to the state that existed prior to the period of inactivity. For example, a user would have to 1) manually power-up the device, 2) wait for the hardware and software of the device to re-boot, 3) remember the applications that were opened, 4) manually open each of these applications, 5) remember the data files that were opened, and 6) manually open each of the data files. As can be appreciated, this manual approach is tedious, time-consuming, inefficient, and generally unacceptable to most users.

One prior art approach to save and restore state information involves using special software that performs the following steps. First, special software is executed by an operating system to save state information to a memory. A period of inactivity follows. Second, when activity resumes, a hardware reboot and a software reboot are performed as if the device is being powered up for the first time. Third, special software instructions are executed by the operating system to restore the previously saved state information to the chips of the device.

As can be appreciated, this software-based approach is tedious, time consuming, and may fail to meet a user's expectation of a speedy and almost instantaneous return to the state of the device as the user had last left. This approach provides a response time that is almost as slow as the response of the device being turned on from a completely off state.

Consequently, it is desirable for there to be a mechanism that quickly and efficiently saves state information without requiring the execution of special software instructions by an operating system. Furthermore, it is desirable for there to be a mechanism that quickly and efficiently restores state information to the chips of the device without requiring a hardware reboot, a software reboot, and the execution of special software instructions by an operating system.

Based on the foregoing, there remains a need for a state save and restore method and system for inactive state power reduction that overcomes the disadvantages set forth previously.

SUMMARY OF THE INVENTION

According to one embodiment of the present invention, a circuit that has the scan-based state save and restore mechanism of the present invention for inactive state power reduction is provided. The circuit has scan circuitry, a constant power area that receives constant power, and a switched power area that receives interruptible power. An inactive state power reduction manager is disposed in the constant power area for receiving a sleep signal, and responsive thereto, for asserting a stop clock signal to stop a normal mode clock, for performing a scan-based state-save, and for asserting a power control signal that is used to disconnect the switched power area from a power supply pad.

The inactive state power reduction manager is also for receiving a wake up signal, and responsive thereto, for de-asserting the power control signal that is used to connect the switched power area to the power supply pad, for performing a scan-based state restore, and for de-asserting the stop clock signal to resume the normal mode clock.

The circuit can include an integrated power switch that is coupled to the inactive state power reduction manager for receiving the power control signal and responsive thereto for selectively removing power from the switched power area.

The circuit can also include a memory (e.g., volatile or non-volatile memory) for storing the state information. The inactive state power reduction manager provides address signals and memory control signals to the memory and manages memory operations that read state information from and write state information to the memory.

According to one embodiment of the present invention, a scan-based state save and restore system for inactive state power reduction is provided. An integrated circuit that has an inactive state includes normal circuitry and scan circuitry. Upon receipt of a sleep signal, the state of the normal circuitry is accessed by employing scan circuitry. The state is then stored in a memory. The power is disconnected from the normal circuitry. Upon wake-up, the normal circuitry is re-connected to the power. The state of the circuit is accessed from the memory and restored to the normal circuitry by employing scan circuitry.

According to one embodiment of the present invention, an inactive state power reduction method for a circuit that has scan circuitry and a switched power portion is provided. First, a sleep signal is received. Responsive to the sleep signal, normal mode clocks are stopped. A state save is then performed by employing the scan circuitry. The switched power portion of the circuit is disconnected from power. A wake-up signal is received. Responsive to the wake-up signal, the switched power portion of the circuit is re-connected to power. A state restore is then performing by employing the scan circuitry. The normal mode clocks are re-started.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A scan-based state save and restore method and system for inactive state power reduction are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

One aspect of the present invention is the use of test circuitry (e.g., scan circuitry) for accessing state information from the storage elements of a circuit, and the use of test circuitry to restore state information to the storage elements of the circuit. In this manner, the power can be disconnected from a portion of the circuit to reduce power consumption during periods of inactivity without the loss of state information.

The scan-based state save and restore mechanism of the present invention enables the state of an integrated circuit (hereinafter also referred to as "chip") to be stored quickly into a memory prior to powering down the chip and then to be quickly restored to the chip without re-booting the chip. The state of a chip is simply the binary values (e.g., ones or zeros) of storage elements in the chip. The storage elements can be, for example, flip-flops or registers.

Prior to powering down the chip (e.g., going to a power down mode), control of the chip is passed to an inactive state power reduction mechanism of the present invention. The inactive state power reduction mechanism performs a scan-based state save and a scan-based state restore. Preferably, the inactive state power reduction mechanism resides on a small section of the chip from which power is not removed during power down.

When a system shutdown is requested, the inactive state power reduction mechanism is started in a state-save mode in which a state-save operation and a state-restore operation are performed. The inactive state power reduction mechanism then stops the normal mode clocks to the chip and places the chip into a power saving mode. The inactive state power reduction mechanism controls scan control lines to scan out the values of the storage elements (e.g., registers or flip-flops) of the chip. This state information is then stored in a memory.

After accomplishing the scan-based state save operation, the inactive state power reduction mechanism removes power from the chip. During a state restore operation, the inactive state power reduction mechanism restores power to the chip. The state information is then scanned back into the storage elements of the chip.

Exemplary Portable Device 100

Figure 1:
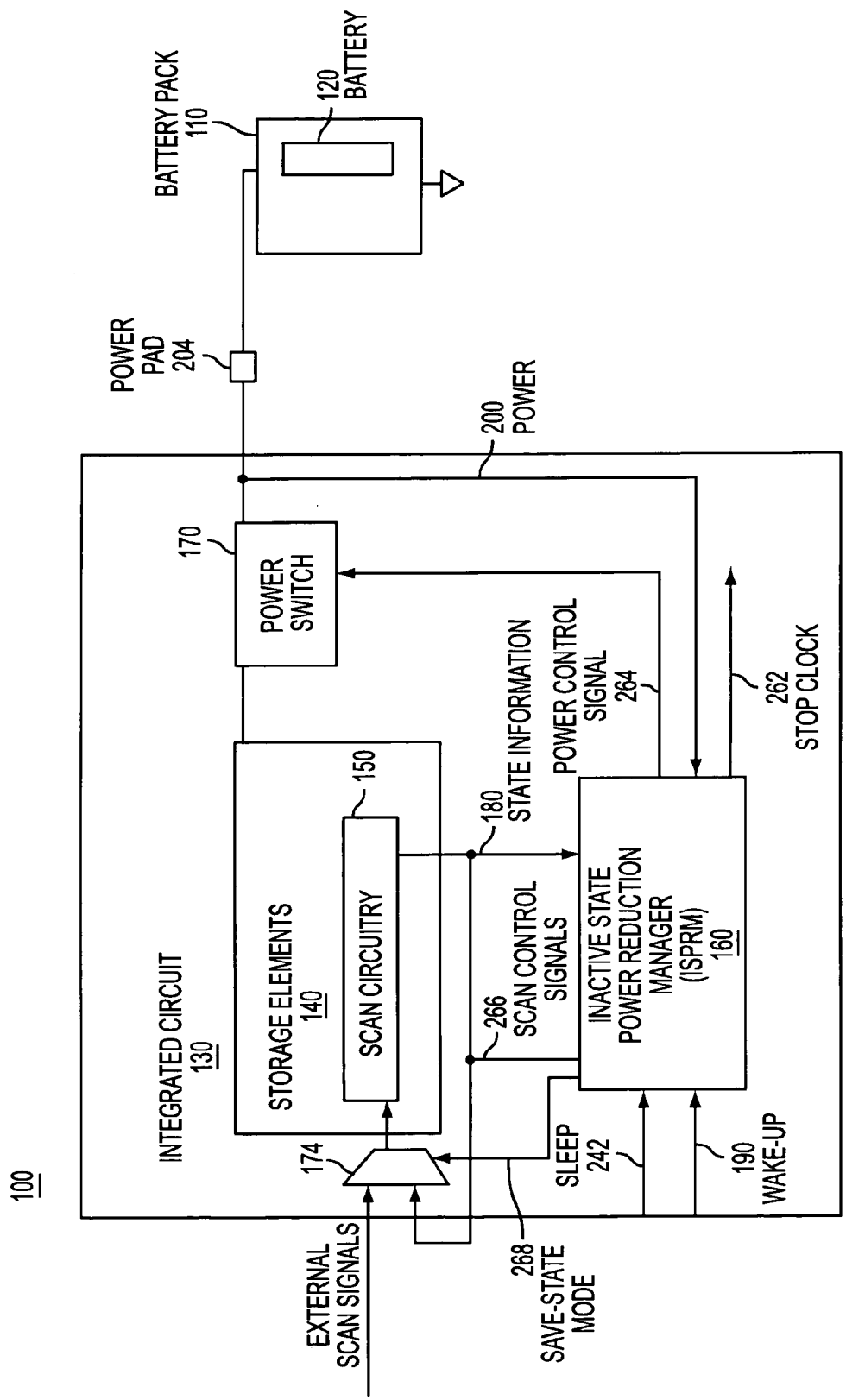
FIG. 1 is a block diagram illustrating an exemplary portable device in which the inactive state power reduction manager of the present invention that employs a scan-based state save and scan-based state restore can be implemented.

FIG. 1 is a block diagram illustrating an exemplary portable device 100 in which the inactive state power reduction manager (ISPRM) 160 of the present invention can be implemented. The portable device 100 includes a power source, such as a battery pack 110, that has one or more batteries (e.g., battery 120).

The portable device 100 also includes an integrated circuit 130 (e.g., an application specific integrated circuit). The circuit 130 typically has thousands of transistors that are configured to implement a logic design. The circuit 130 requires power management. For example, the circuit 130 can be manufactured with a sub-micron process. When such a manufacturing process is utilized, each transistor in the chip 130 can have a large leakage current that leads to power loss even during periods when the normal mode clocks are stopped.

The circuit 130 also includes storage elements 140 that store bits of information, which are being processed by the integrated circuit 130. The storage elements 130 can be, for example, flip-flops or registers. The circuit 130 also has scan circuitry 150, which is described in greater detail hereinafter.

ISPRM 160

The circuit 130 also includes an inactive state power reduction manager (ISPRM) 160 for power management of the circuit 130 during periods of inactivity. The inactive state power reduction manager (ISPRM) 160 receives a sleep signal 242 and a wake-up signal 190. Responsive to the sleep signal 244, the ISPRM 160 stops the normal mode clocks, performs a scan-based state save, and removes power from a large portion of the chip 130. By disconnecting a large portion of the circuit 130 from power 200, the inactive state power reduction manager (ISPRM) 160 reduces or eliminates the leakage current through the transistors in that portion of the circuit 130, thereby saving power during periods of inactivity. Responsive to the wake-up signal 190, the ISPRM 160 restores power to the chip 130, performs a scan-based state restore, and then re-starts the normal mode clocks.

The ISPRM 160 of the present invention utilizes signals, such as a stop clock signal 262, a power control signal 264, scan control signals 266, and a save state mode signal 268, to perform the above functions. These signals are described in greater detail hereinafter.

As described earlier, the inactive state power reduction manager (ISPRM) 160 of the present invention performs a scan-based state save and state restore. Specifically, the inactive state power reduction manager (ISPRM) 160 of the present invention uses the scan circuitry 150 to read and write state information to the storage elements 140 so that power can be disconnected from the circuit 130 without losing the state information.

During power saving mode, the ISPRM 160 accesses the state of the circuit 130 (e.g., the state information stored in the storage elements 140) by using the scan circuitry 150 and writes the state information to a memory that is described in greater detail hereinafter. The use of scan circuitry 150 to access or retrieve state information from the storage elements 140 of the circuit 130 is referred to herein as scan-based state save operation.

Similarly, during power saving mode, the ISPRM 160 reads state information (e.g., previously stored state information) from the memory and restores the state information to the storage elements 140 of the circuit 130 by utilizing the scan circuitry 150. The use of scan circuitry 150 to restore state information to the storage elements 140 of the circuit 130 is referred to herein as scan-based state restore operation.

As described in greater detail hereinafter with reference to FIG. 2, the inactive state power reduction manager 160 can be implemented in hardware as an independent finite state machine. Furthermore, the inactive state power reduction manager (ISPRM) 160 can be implemented in a single integrated circuit or as a chip set. Moreover, as described in greater detail hereinafter with reference to FIG. 7, the inactive state power reduction mechanism of the present invention can be implemented on a board level.

The circuit 130 has a selection unit 174 for receiving external scan signals (e.g., data and control signals), scan signals from the ISPRM 160 (e.g., state information 180 and scan control signals 266), and a save-state mode signal 268.

Based on the save-state mode signal 268, the selection unit 174 selectively provides either the external scan signals or scan signals generated by the ISPRM 160 as output.

The chip 130 includes a power switch 170 that can be used by the ISPRM 160 to remove power 200 from the chip 130 in order to conserve power. For example, the ISPRM 160 of the present invention can assert a power control signal 264 that causes the power switch 170 to disconnect the circuit 130 from a power pad 284 during periods of inactivity.

Scan Circuitry 150

Scan circuitry 150 is generally well-known to those of ordinary skill in the art and is commonly utilized in testing (e.g., manufacturing tests) the functionality of integrated circuits. One aspect of the present invention is the use of the scan circuitry 150 for accessing and restoring state information to enable power reduction and conservation (i.e., to enable a chip to power down without losing the state information).

The scan circuitry 150 can include one or more scan chains that are utilized to shift out the contents of the storage elements 140 (e.g., a plurality of registers). For example, the storage elements 140 of the chip 130 can be wired into one or more scan chains using alternate circuitry.

Scan circuitry 150 can include multiplexers (not shown) that are placed in front of each of the registers under test. These multiplexers are employed to select either a scan-in signal or a normal operational signal for input to the registers. During normal operation, multiplexers select the normal input to the registers. The integrated circuit (e.g., a processor) runs according to one or more system clocks.

In test mode, a scan-in signal is selected by the multiplexers for input to the registers. Test data can be sequentially scanned into registers by shifting the data in one bit at a time according to a test clock (e.g., a scan clock). For example, a first test bit of is shifted into a first register via a first multiplexer, and the first test bit is shifted from the first register into a second register via a second multiplexer. This process is repeated for each test bit until each of the registers contains the test data. Once the registers have been properly configured to the desired state, a command is issued to execute one clock cycle, and the contents of the registers can be shifted out and compared with the expected data. This procedure is normally utilized to determine if the device has been fabricated correctly. The operation and configuration of the scan circuitry 150 is well known to those of ordinary skill in the art and will not be described further herein.

Integrated Circuit 130

Figure 2:
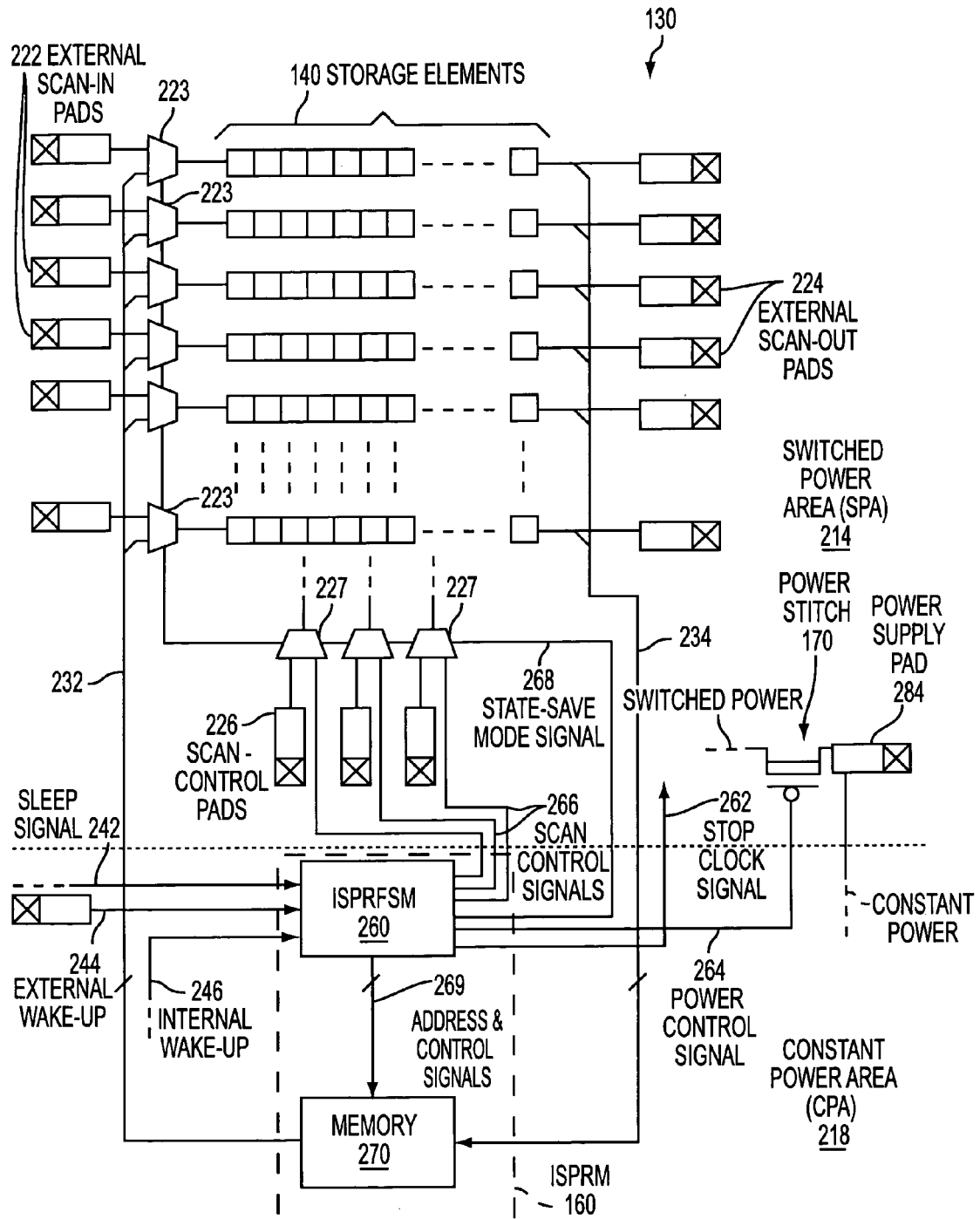
FIG. 2 illustrates in greater detail the circuit of FIG. 1 in accordance with one embodiment of the present invention.

FIG. 2 illustrates in greater detail the circuit 130 of FIG. 1 in accordance with one embodiment of the present invention. The circuit 130 includes a switched power area (SPA) 214 and a constant power area (CPA) 218. The switched power area (SPA) 214 receives an interruptible power supply, and the constant power area (CPA) 218 receives a constant power supply. For example, the transistors in the constant power area 218 can be constantly supplied with power via a direct connection to the power supply pad 284.

The transistors in the switched power area 214 are disconnected from power (e.g., a power supply pad 284) when the power switch 170 is off. Similarly, the transistors in the switched power area 214 are connected to power (e.g., the power supply pad 284) when the power switch 170 is on. The power switch 170 is controlled by the power control signal 264 that is provided by the ISPRFSM 260. In this embodiment, the power switch 170 is implemented with a power field effect transistor (FET). The power switch 170 can be on-chip (i.e., integrated with the chip 130) or off-chip (i.e., external to the chip 130).

A first path 232 is provided to restore state information that is stored in the memory 270 to the storage elements 140. A second path 232 is provided to save state information of the storage elements 140 into the memory 270.

A plurality of external scan-in pads 222 are provided to write test data into the storage elements 140 of the circuit 130. A plurality of external scan-out pads 224 are provided to read data from the storage elements 140 of the circuit 130. A plurality of scan control signal pads 226 are provided to manage the scan-in and scan-out of the scan test. The scan control signals can include a scan clock signal and a test mode signal. These scan-related pads 222, 224, 226 are utilized for typical scan-based circuit testing. As described in greater detail hereinafter with reference to FIG. 7, these scan pads can be utilized to perform the scan-based state save and restore operations of the present invention on a board level, where the power reduction manager of the present invention is external to the chip 130.

The circuit 130 also includes a memory 270 for use in storing state information. It is noted that the memory 270 can be integrated with the chip 130 or external to the chip 130. The memory 270 can be a volatile memory or a non-volatile memory. When the memory 270 is disposed in the constant power area 218, the memory 270 can be a volatile memory (e.g., a random access memory (RAM)). However, when the memory 270 is disposed in the switched power area (SPA) 214, the memory 270 is preferably a non-volatile memory (e.g., an EEPROM) so that the information stored therein is retained during periods of inactivity when the memory 270 is disconnected from power.

The circuit 130 also includes a plurality of multiplexers 223 for selectively providing as output either signals from the external scan-in pads 222 or signals (e.g., state information) from the first path 232. The state information can be retrieved from the memory 270. The circuit 130 also includes a plurality of multiplexers 227 for selectively providing as output either control signals provided from the external scan-control pads 226 or scan control signals provided by the ISPRFSM 260.

The multiplexers 223, 227 are controlled by a state-save mode signal 268 that is asserted by the ISPRFSM 260 when the device is in a state-save mode (i.e., a power saving mode). When the state-save mode signal 268 is asserted, the multiplexers 227 select scan control signals provided by the ISPRFSM 260, and the multiplexers 223 select data provided by the memory 270. In this manner, previously stored state information is restored to the storage elements 140 under the control of the ISPRFSM 260. Moreover, data from the external scan-in pads 222 and scan control signals from the scan control pads 226 are prevented from affecting the scan-based state save and scan-based state restore operations performed by the ISPRFSM 260 of the present invention.

ISPRFSM 260

Upon receipt of an asserted sleep signal, the ISPRFSM 260 asserts a stop clock signal 262 for stopping the normal mode clocks (e.g., the system clocks). It is noted that the sleep signal 242 can be provided by a processor or microcontroller or by a human trigger. For example, a microcontroller can use a timer to track the time of inactivity. When the time of inactivity exceeds a predetermined amount of time (e.g., 5 minutes), the microcontroller can assert the sleep signal that is used by the ISPRFSM 260 of the present invention to reduce power consumption.

The ISPRFSM 260 then asserts the state-save mode signal 268 and utilizes the scan control signals 266 to scan-out the state of the storage elements 140 through the second path 234 and to store the state information in the memory 270. The ISPRFSM 260 utilizes memory address and control signals 269 (e.g., address signals, read/write signal, column address strobe, row address strobe, etc.) that are well-known to those of ordinary skill in the art to control and manage the write operation for writing state information to the memory 270. The ISPRFSM 260 then asserts the power control signal 264 to turn the power switch 170 off so that the SPA 214 is disconnected from the power supply pad 284.

The power remains off until the receipt of a wake-up signal 190. The wake-up signal 190 can be, for example, an external wake-up signal 244 that is provided by an associated pad or an internal wake-up signal 246. Responsive to the wake-up signal, the ISPRFSM 260 utilizes the scan control signals 266 to scan-in to the storage elements 140 through the first path 232 state information that is stored in the memory 270.

Although this example has been described as having a wake-up signal 190, in an alternative embodiment, no wake-up signal is employed. In this alternative embodiment, the chip 130 wakes up when the sleep signal 242 is de-asserted. For example, the sleep signal 242 can be de-asserted by a human trigger (e.g., when a user activates a button or touches a screen). Alternatively, an application that has access to a real-time system clock can wake-up the circuit at a predetermined time that may be programmed by the user. When the predetermined scheduled time is reached, the application can assert an interrupt to de-assert the sleep signal 242.

Inactive State Power Reduction Processing

Figure 3:
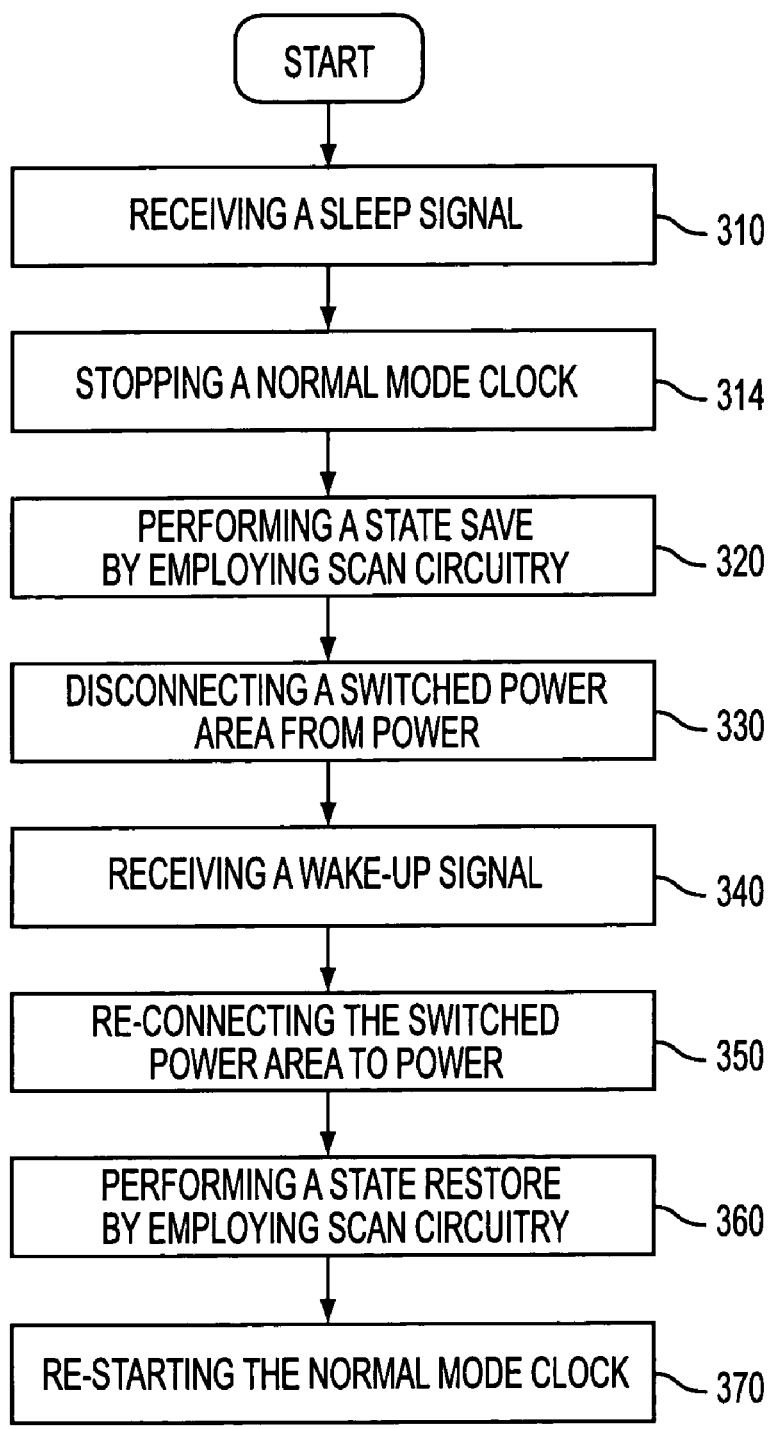
FIG. 3 is a flowchart illustrating the processing steps performed by the inactive state power reduction manager in accordance with one embodiment of the present invention.

FIG. 3 is a flowchart illustrating the steps performed by the inactive state power reduction manager in accordance with one embodiment of the present invention. In step 310, a power down signal (e.g., a sleep signal 242) is received. In step 314, normal mode clocks (e.g., system clocks) are stopped. The normal mode clocks can be stopped by asserting the stop clock signal 262. In step 320, a state save is performed by employing scan circuitry 150 (hereinafter also referred to as a scan-based state save). For example, scan control signals 266 and the state-save mode signal 268 can be utilized to scan out values of all storage elements to the memory 270 through path 234. This step can also involve the sub-steps of providing address signals and other memory control signals 269 to manage write operations that write the state information to the memory 270.

In step 330, a switched power area 214 is disconnected from power. This step can be performed by asserting the power control signal 264 in order to turn the power switch 170 off, thereby disconnecting the SPA 214 from the power supply pad 284.

In step 340, a power-up signal (e.g., a wake up signal 190) is received. In step 350, the switched power area 214 is re-connected to power. This step can be performed by de-asserting the power control signal 264 in order to turn the power switch 170 on, thereby re-connecting the SPA 214 to the power supply pad 284.

In step 360, a state restore is performed by employing scan circuitry 150 (hereinafter also referred to as a scan-based state restore). For example, scan control signals can be utilized to scan-in values from the memory 270 to the storage elements 140 through path 232. This step can also involve the sub-steps of providing address signals and other memory control signals 269 to manage read operations that read state information from the memory 270.

In step 370, the normal mode clocks are re-started by de-asserting the stop clock signal 262, for example.

Accordingly, the inactive state power reduction manager of the present invention provides a scan-based state save and scan-based state restore without the need for complex hardware and software interaction or system reboot. The full state of an integrated circuit may be save with a maximum of 1-bit of memory per storage element (e.g., 1-bit per flip-flop). It is noted that data compression algorithms that are well-known to those of ordinary skill in the art may be applied to further reduce the memory requirement needed for a state save.

State Diagrams for ISPRFSM 260

Figure 4:
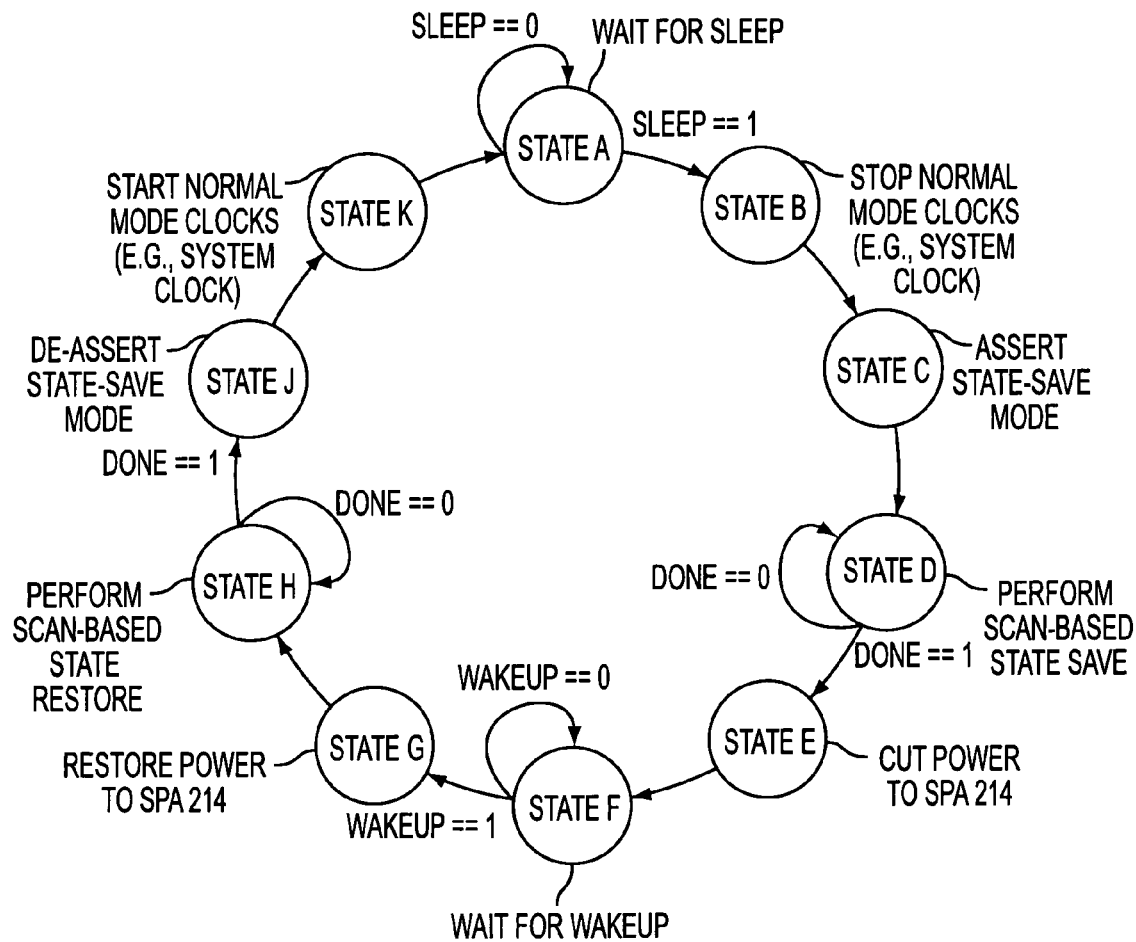
FIG. 4 is a state diagram illustrating the steps performed by the inactive state power reduction finite state machine of FIG. 2 in accordance with one embodiment of the present invention.

FIG. 4 is a state diagram illustrating the steps performed by the inactive state power reduction finite state machine (ISPRFSM) 260 in accordance with one embodiment of the present invention. In state A, the ISPRFSM 260 waits for the sleep signal 242 to be asserted. The ISPRFSM 260 remains idle in state A until the sleep signal 242 is asserted (i.e., Sleep==1). The ISPRFSM 260 transitions to state B when the sleep signal 242 is asserted. In state B, the ISPRFSM 260 stops the system clocks (e.g., the normal mode clocks) that drive the normal mode circuitry (i.e., non-scan related circuits). The system clocks may be stopped, for example, by asserting the stop clock signal 262. Once the normal mode clocks (e.g., systems clocks) have been stopped, the ISPRFSM 260 transitions to state C. In state C, state-save mode is asserted.

In state D, the ISPRFSM 260 performs a scan-based state save. The processing steps related to un-loading state information from the storage elements 140 to the memory 270 (i.e., state D) by using the scan circuitry 150 are described in greater detail hereinafter with reference to FIG. 5. When the scan-based state save is completed (i.e., DONE==1), the ISPRFSM 260 transitions to state E. Otherwise, when the scan-based state save is not completed (i.e., when DONE==0), the ISPRFSM 260 remains in state D until scan-based state save operation is completed.

In state E, power to the switched power area 214 is disconnected or cut. For example, the power control signal (PCS) 264 can be utilized to turn the power switch 170 off, thereby disconnecting the SPA 214 from the power supply pad 284.

In state F, the ISPRFSM 260 waits for a wake-up signal 190 (e.g., external wake-up signal 244 or internal wake-up signal 246). When wakeup==0, the ISPRFSM 260 remains in state F. Otherwise, when wakeup==1, the ISPRFSM 260 transitions to state G.

In state G, power to the switched power area 214 is restored. For example, the power control signal (PCS) 264 can be utilized to turn the power switch 170 on, thereby re-connecting the SPA 214 to the power supply pad 284.

In state H, the ISPRFSM 260 performs a scan-based state restore. When the scan-based state restore is completed (i.e., DONE 1), the ISPRFSM 260 transitions to state J. Otherwise, when the scan-based state restore is not completed (i.e., when DONE==0), the ISPRFSM 260 remains in state H until scan-based state restore operation is completed.

The processing steps related to loading the storage elements 140 with state information from the memory 270 (i.e., state H) by using the scan circuitry 150 are described in greater detail hereinafter with reference to FIG. 6.

In state J, the state-save mode is de-asserted. In state K, the normal mode clocks (e.g., system clocks) are re-started. Then, the ISPRFSM 260 transitions to state A, where the ISPRFSM 260 waits for a sleep signal 242.

Unloading the Storage Elements to Memory

Figure 5:
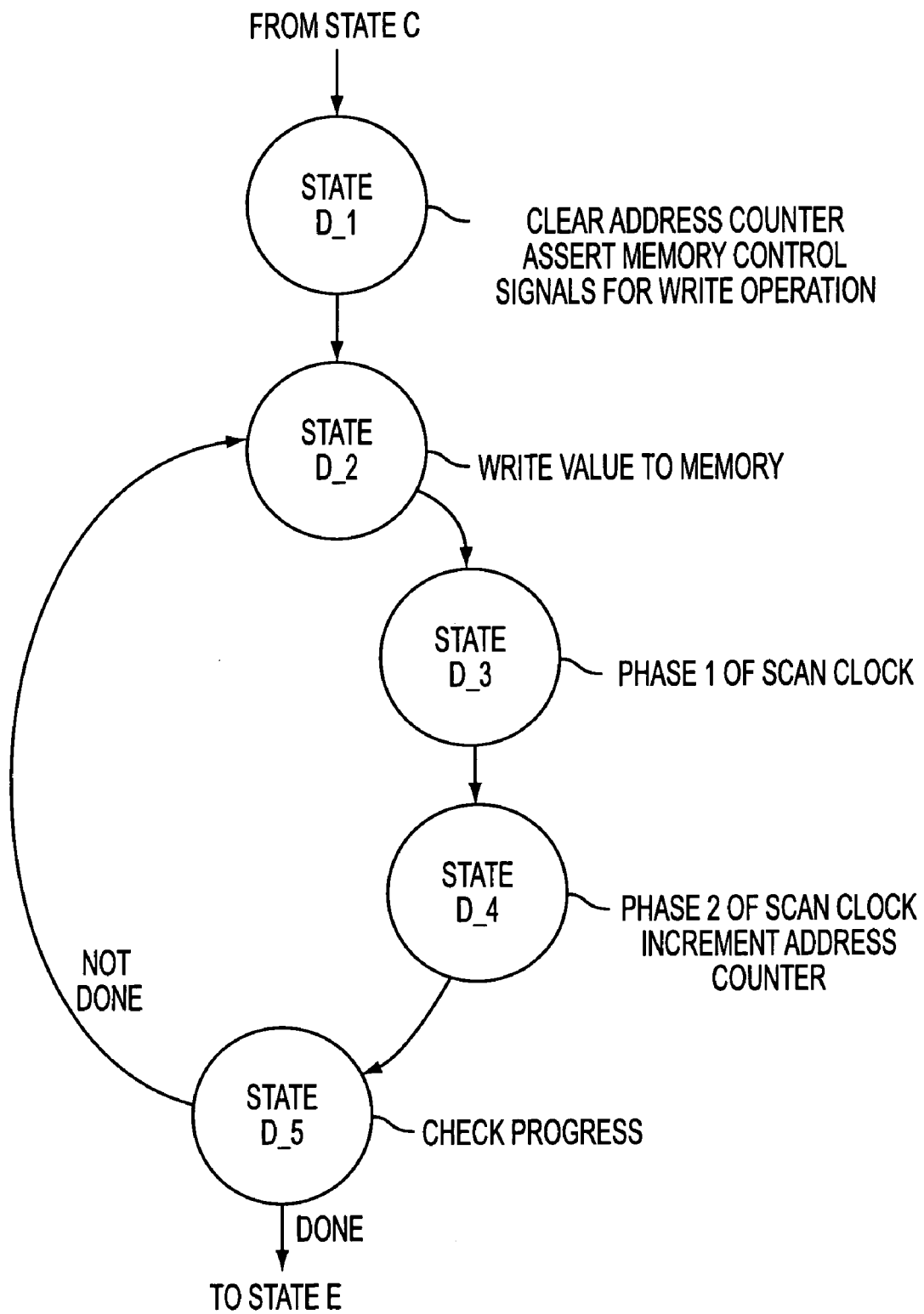
FIG. 5 is a state diagram illustrating in greater detail state D of FIG. 4 in accordance with one embodiment of the present invention.

FIG. 5 is a state diagram illustrating in greater detail state D of FIG. 4 in accordance with one embodiment of the present invention. In state D_1, an address counter for the memory 270 is cleared, and the memory control signals 269 are utilized for writing information to memory 270. In state D_2, state information is written to the memory 270 by using the scan circuitry 150. In state D_3, ISPRFSM 260 processes the first phase (e.g., phase 1) of a scan clock (also referred to as a test clock). In this step, the ISPRFSM 260 allows data from scan-in port to update master part of the flip-flop (FF) for each FF in each scan chain (i.e., all FFs in the design).

In state D_4, the ISPRFSM 260 processes the second phase (e.g., phase 2) of the scan clock. In this step, the ISPRFSM 260 moves data from master to slave part of each FF. This data appears at Q port of FF, so that the data is ready to be written to the memory 270 in a subsequent write operation. For example, the subsequent write operation can occur when the state machine returns to state D_2 after state D_5 determines that the state save operation is not done. The address counter is also incremented in state D_4.

In state D_5, the ISPRFSM 260 checks the address counter against a value predetermined by a chip designer to be the value that the address counter reaches when all the data in the FFs has been stored in the RAM.

An internal signal DONE can be asserted when data in the scan chain has been stored in the memory 270. When the DONE signal is not asserted, processing continues at state D_2. When the DONE signal is asserted, processing proceeds to state E.

It is noted that during the when power is disconnected from the SPA 214 (e.g., during state E, F, and G) the transistors in the SPA 214 have no leakage current, thereby saving power.

Loading the Storage Elements from Memory

Figure 6:
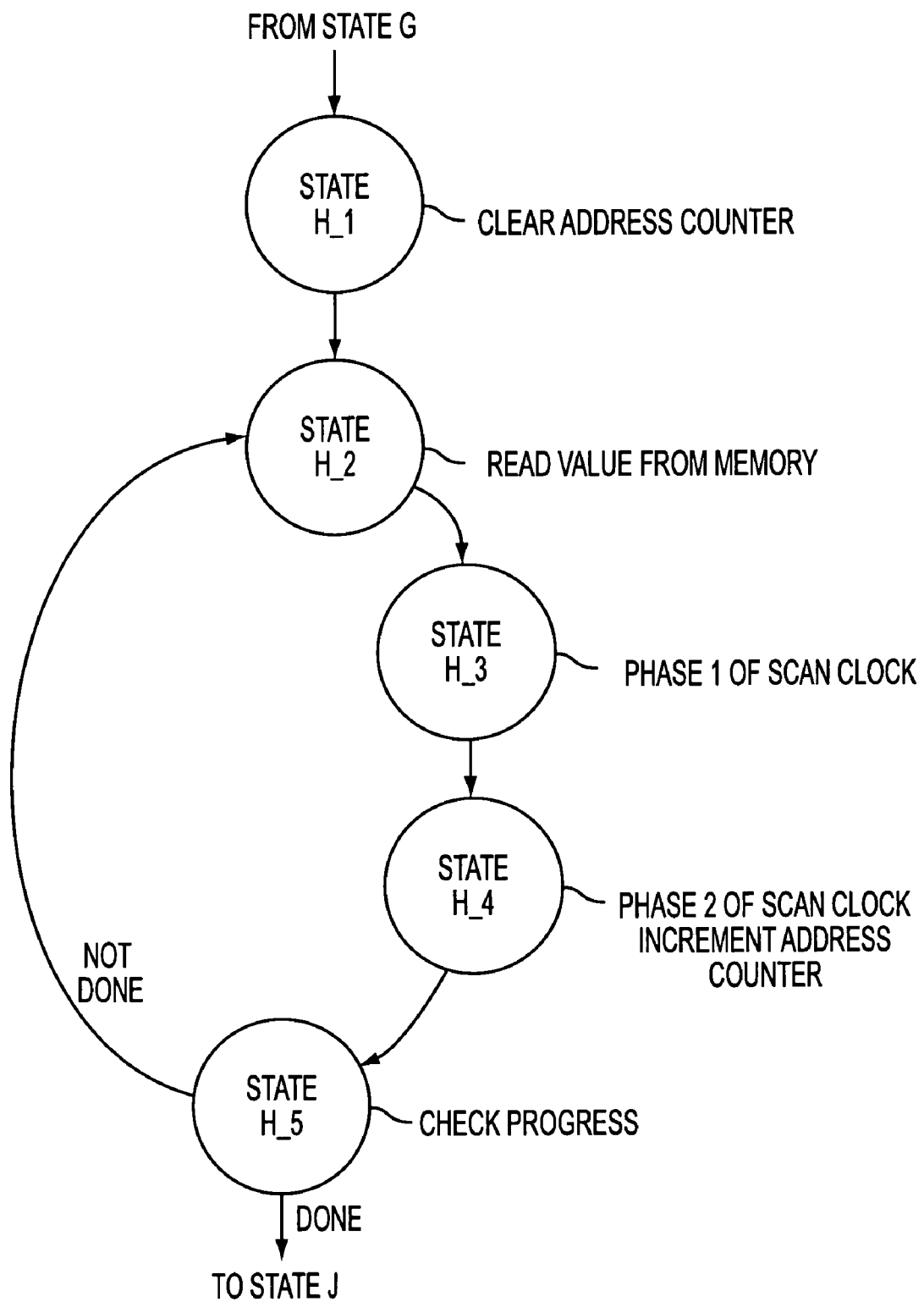
FIG. 6 is a state diagram illustrating in greater detail state H of FIG. 4 in accordance with one embodiment of the present invention.

FIG. 6 is a state diagram illustrating in greater detail state H of FIG. 4 in accordance with one embodiment of the present invention. In state H_1, an address counter for the memory 270 is cleared, and memory signals utilized for reading information to memory 270 are asserted. In state H_2, state information is read from the memory 270.

States H_3, H_4, and H_5 perform the same functions as D_3 through D_5, but with the effect of moving the state information from the memory 270 to the storage elements 140 (e.g., flip-flops (FFs)). In state H_3, the ISPRFSM 260 processes the first phase (e.g., phase 1) of the scan clock. In state H_4, the ISPRFSM 260 processes the second phase (e.g., phase 2) of the scan clock. The address counter is also incremented in state H_4.

In state H_5, the ISPRFSM 260 checks the progress of the state restore. In state D_5, the ISPRFSM 260 checks the address counter against a value predetermined by a chip designer to be the value that the address counter reaches when all the data has been read from the memory 270 and written to the storage elements 140.

An internal signal DONE can be asserted when data in the scan chain has been stored in the memory 270. When the DONE signal is not asserted, processing continues at state D_2. When the DONE signal is asserted, processing proceeds to state E.

It is noted that the inactive state power reduction mechanism of the present invention reduces the amount of time needed by a prior art approach to save state information and/or to restore state information and to restart a complex integrated circuit.

The time needed by the inactive state power reduction mechanism of the present invention to perform a state save or state restore can be estimated by the following equation:

$$T=FFs/(\text{scan\_chains}*\text{frequency})$$

where FFs is the total number of flip-flops, scan_chains is the number of scan chains that the flip-flops are organized into (with all scan chains being of the same length), and frequency is the frequency at which the scan chains are clocked during the scan. Consider a typical integrated circuit design with 25,000 flip-flops, which are organized into sixteen scan chains, and scanned at a frequency of 32 kHz. Using this equation, the inactive state power reduction mechanism of the present invention requires roughly 50 ms to perform a state save or a state restore on such an integrated circuit.

Circuit Board Implementation of the Power Reduction Mechanism

Figure 7:
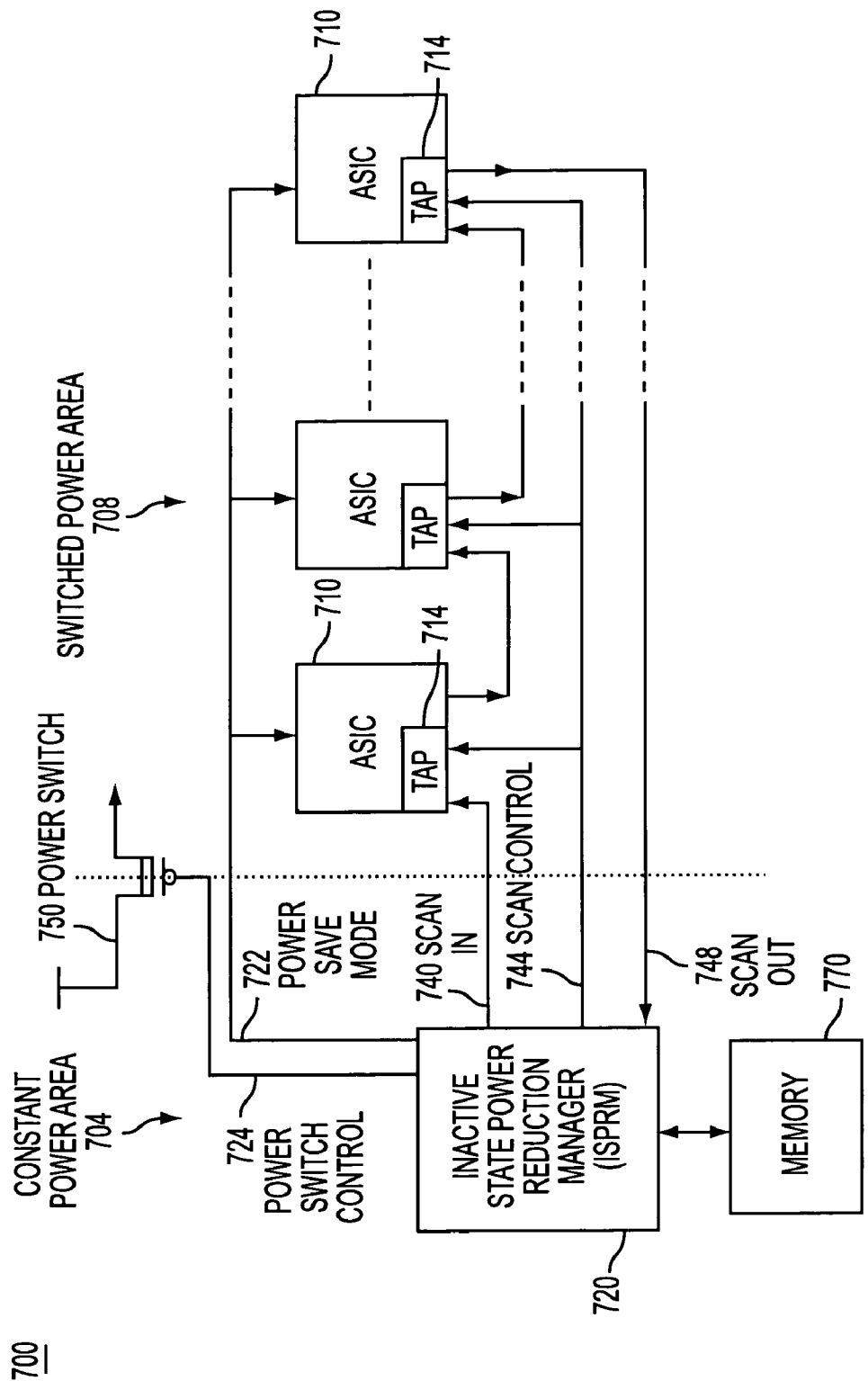
FIG. 7 illustrates a system-level implementation of the inactive state power reduction mechanism in accordance with one embodiment of the present invention.

FIG. 7 illustrates a system 700 having the inactive state power reduction mechanism. The inactive state power reduction mechanism of the present invention can be implemented in any board-level system (e.g., system 700). The system 700 can, for example, be a circuit board with a plurality of components 710.

The system 700 includes a constant power area (CPA) 704 and a switched power area (SPA) 708. The constant power area 704 includes an inactive state power reduction manager (ISPRM) 720 for saving power during periods of inactivity and a memory 770. The ISPRM 720 employs scan circuitry to perform a state save and a state restore. It is noted that when the memory 770 is a non-volatile memory, memory 770 can be disposed in the switched power area 708.

The switched power area 708 includes a plurality of components 710 (e.g., application specific integrated circuits (ASICs)). Each component 710 has internal scan circuitry and is capable of being scanned. For example, each component may include a test and access port (TAP) 714 through which state information can be accessed. The TAP 714 typically accommodates a plurality of signals that can include, for example, a serial-in signal, a serial-out signal, a test clock, and a test mode select signal that are known to those of ordinary skill in the art.

The test and access port (TAP) 714 can, for example, be compliant with the IEEE 1149.1 Standard Test Access Port and Boundary Scan Architecture, or other scan architecture. It is noted that any form of scan (e.g., JTAG) can be utilized, as long as the scan provides access to the internal scan chains of the components 710.

The ISPRM 720 selectively places the components 710 into a power save mode. For example, the ISPRM 720 can assert a power save mode signal 722 to place the components 710 into a power save mode. When in the power save mode, the ISPRM 720 utilizes a scan in path 740, a scan control path 744, and a scan out path 748 to retrieve state information from each component 710 and to restore state information to each component 710.

For example, before removing power from the switched power area 708, the state information from each component 710 can be retrieved and stored into a memory 770. Similarly, before power is restored to the switched power area 708, the state information stored in the memory 770 can be written (i.e., restored) to the registers of the components 710.

The system 700 also includes a power switch 750, which can be, for example, a power field effect transistor (FET)). The ISPRM 720 selectively asserts a power switch control signal 724 for controlling the power switch 750. When the power switch 750 is on, the components 710 in the switched power area 708 have power. When the power switch 750 is off, the components 710 in the switched power 708 area are disconnected from power, thereby reducing power consumption for the board during inactive state (e.g., a period of inactivity).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

For example, this invention has been described in the context of a power reduction mechanism that is used in an integrated circuit or chip set. However, it is to be appreciated that the can be applied to many different applications in a wide number of different areas. The power reduction mechanism of the present invention is beneficial whenever it is desired or required that power be conserved. For example, circuits (e.g., a microprocessor chip for use in mobile applications) in portable devices or battery-powered devices would benefit from a mechanism that allows power to be dis-connected from the normal circuits during periods of inactivity and that quickly restores the state of the circuit upon wake-up so that it appears to a user that the device or applications that were executing or the files that were open had never been interrupted.

What is claimed is:

1. A circuit having scan circuitry comprising:
a constant power area that receives constant power;
a switched power area that receives interruptible power;
wherein the switched power area includes an input for receiving a normal mode clock signal; and
an inactive state power reduction manager disposed in the constant power area for receiving a sleep signal and responsive thereto for asserting a stop clock signal to stop the normal mode clock, for performing a scan-based state-save by employing the scan circuitry, and for asserting a power control signal that is used to disconnect the switched power area from a power supply pad; and
a selection unit that includes a first input for receiving signals from a source external to the circuit, a second input for receiving signals from the inactive state power reduction manager, a control input for receiving a save-state mode signal, and an output that is coupled to the scan circuitry; wherein the inactive state power reduction manager performs a scan-based state-save by generating the save-state mode signal and by providing signals to the second input of the selection unit.

2. The circuit of claim 1 further comprising:
a power switch coupled to the inactive state power reduction manager for receiving the power control signal and responsive thereto for selectively removing power from the switched power area.

3. The circuit of claim 2 wherein the power switch is a field effect transistor (FET) having a first electrode coupled to a power source, a second electrode coupled to the switched power area, and a third electrode for receiving the power control signal.

4. The circuit of claim 1 wherein the inactive state power reduction manager generates a plurality of scan control signals to perform the scan-based state store and scan-based state restore; and wherein the scan control signals includes a scan clock signal.

5. The circuit of claim 1 wherein the inactive state power reduction manager employs the scan circuitry to save state information and to restore state information.

6. The circuit of claim 1 wherein the wake-up signal is one of an internal wake-up signal and an external wake-up signal.

7. The circuit of claim 1 wherein the wake-up signal provided by one of a human trigger, an application, and a timer.

8. The circuit of claim 1 further comprising:
d) a memory for storing the state information; and
wherein the inactive state power reduction manager provides address signals and memory control signals to the memory and manages memory operations that read state information from and write state information to the memory.

9. The circuit of claim 8 wherein the memory is one of a volatile memory, a random access memory, and a non-volatile memory.

10. The circuit of claim 8 wherein the memory is disposed in one of the constant power area and the switched power area.

11. The circuit of claim 1 wherein the circuit is implemented in a board level application.

12. The circuit of claim 1 wherein inactive state power reduction manager receives a wake up signal, and responsive thereto for de-asserting the power control signal that is used to connect the switched power area to the power supply pad, for performing a scan-based state restore by employing the scan circuitry, and for de-asserting the stop clock signal to resume the normal mode clock.

13. The method of claim 12 wherein performing a state restore using the scan circuitry includes
reading the previously stored state information from a memory; and
using the scan circuitry to write the state information to the circuit.

14. A method for inactive state power reduction for a circuit that has scan circuitry and a switched power portion; wherein the switched power portion includes an input for receiving a normal mode clock signal, the method comprising:
receiving a sleep signal;
responsive to the sleep signal,
stopping the normal mode clock;
performing a state save by employing the scan circuitry and a selection unit that includes a first input for receiving signals from a source external to the circuit, a second input for receiving signals from an inactive state power reduction manager, a control input for receiving a save-state mode signal, and an output that is coupled to the scan circuitry; and
d) disconnecting the switched power portion of the circuit from power.

15. The method of claim 14 wherein performing a state save using the scan circuitry includes
using the scan circuitry to obtain state information from the circuit; and
storing the state information in a memory.

16. The method of claim 14 further comprising:
receiving a wake-up signal;
responsive to the wake-up signal,
re-connecting the switched power portion of the circuit to power;
performing a state restore by employing the scan circuitry; and
re-starting the normal mode clock.

17. A circuit board comprising:
a first integrated circuit having a test access port; an input for receiving a normal mode clock signal;
a second integrated circuit having a test access port ; an input for receiving the normal mode clock signal; and
an inactive state power reduction manager coupled to the first integrated circuit and the second integrated circuit for receiving a sleep signal and responsive thereto for asserting a stop clock signal to stop the normal mode clock, for performing a scan-based state save of state information of the first integrated circuit and the second integrated circuit by using the test access port of the first integrated circuit and the second integrated circuit, respectively, and for asserting a power control signal that is used to disconnect the first integrated circuit and the second integrated circuit from a power supply; and
a selection unit that includes a first input for receiving signals from a source external to the circuit, a second input for receiving signals from the inactive state power reduction manager, a control input for receiving a save-state mode signal from the inactive state power reduction manager, and an output that is coupled to the test access port.

18. The circuit of claim 17 further comprising:
a power switch coupled to the inactive state power reduction manager for receiving the power control signal and responsive thereto for selectively removing power from the first integrated circuit and the second integrated circuit.

19. The circuit of claim 17 further comprising:
a memory for storing the state information; and
wherein the inactive state power reduction manager provides address signals and memory control signals to the memory and manages memory operations that read state information from and write state information to the memory.

20. The circuit board of claim 17 wherein inactive state power reduction manager receives a wake up signal, and responsive thereto for de-asserting the power control signal that is used to re-connect the first integrated circuit and the second integrated circuit to the power supply, for performing a scan-based state restore for restoring state information to the first integrated circuit and the second integrated circuit by using the test access port of the first integrated circuit and the second integrated circuit, respectively, and for de-asserting the stop clock signal to resume the normal mode clock.

* * * * *